(12) United States Patent
Mitschke et al.

(10) Patent No.: US 8,256,299 B2
(45) Date of Patent: Sep. 4, 2012

(54) PRESSURE SENSOR HAVING A CAP ABOVE A FIRST DIAPHRAGM CONNECTED TO A HOLLOW SPACE BELOW A SECOND DIAPHRAGM

(75) Inventors: Michaela Mitschke, Reutlingen (DE); Hubert Benzel, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 375 days.

(21) Appl. No.: 12/590,583

(22) Filed: Nov. 9, 2009

(65) Prior Publication Data
US 2010/0139409 A1   Jun. 10, 2010

(30) Foreign Application Priority Data
Dec. 9, 2008   (DE) .................. 10 2008 054 428

(51) Int. Cl.
*G01L 13/02* (2006.01)
*G01L 15/00* (2006.01)
(52) U.S. Cl. .................. 73/716; 73/754; 361/283.4
(58) Field of Classification Search .................. None
See application file for complete search history.

(56) References Cited

U.S. PATENT DOCUMENTS

| 4,771,638 | A  | * | 9/1988  | Sugiyama et al. ............ 73/721 |
| 4,773,269 | A  | * | 9/1988  | Knecht et al. ................. 73/706 |
| 4,790,192 | A  | * | 12/1988 | Knecht et al. ................. 73/721 |
| 5,499,158 | A  | * | 3/1996  | Bishop et al. ............. 361/283.4 |
| 5,531,120 | A  | * | 7/1996  | Nagasu et al. ................ 73/706 |
| 6,012,336 | A  | * | 1/2000  | Eaton et al. .................. 73/754 |
| 6,041,659 | A  | * | 3/2000  | Wilda et al. .................. 73/720 |
| 6,920,795 | B2 | * | 7/2005  | Bischoff et al. .............. 73/706 |
| 7,216,547 | B1 | * | 5/2007  | Stewart et al. ................ 73/756 |
| 7,902,843 | B2 | * | 3/2011  | Fang et al. ................. 324/686 |
| 2005/0241400 | A1 | | 11/2005 | Vossenberg |

FOREIGN PATENT DOCUMENTS
DE    10 2004 021 041    11/2005
* cited by examiner

*Primary Examiner* — Lisa Caputo
*Assistant Examiner* — Jermaine Jenkins
(74) *Attorney, Agent, or Firm* — Kenyon & Kenyon LLP

(57) ABSTRACT

A micromechanical pressure sensor includes a first diaphragm and a second diaphragm accommodated in a shared semiconductor substrate. The two diaphragms facilitate independent pressure sensing of one or more media, by the fact that a respective pressure variable is sensed by way of the deflection of the respective diaphragm. A cap above the first diaphragm defines a hollow space that is connected to the hollow space below the second diaphragm.

7 Claims, 1 Drawing Sheet

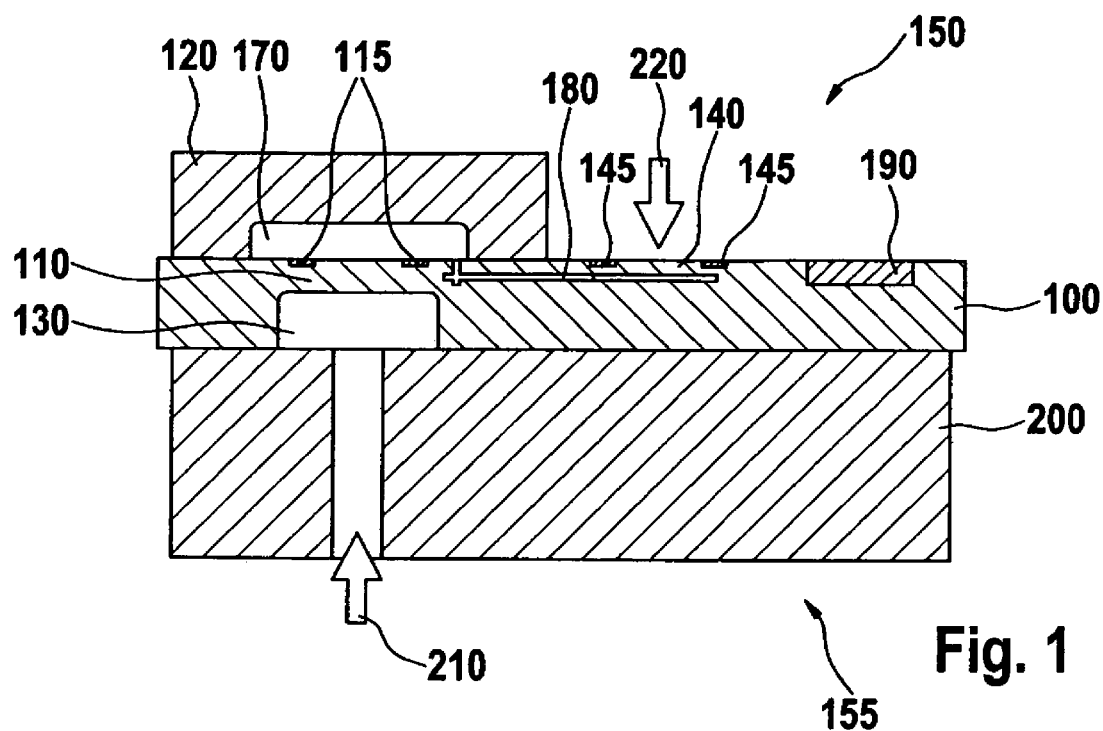
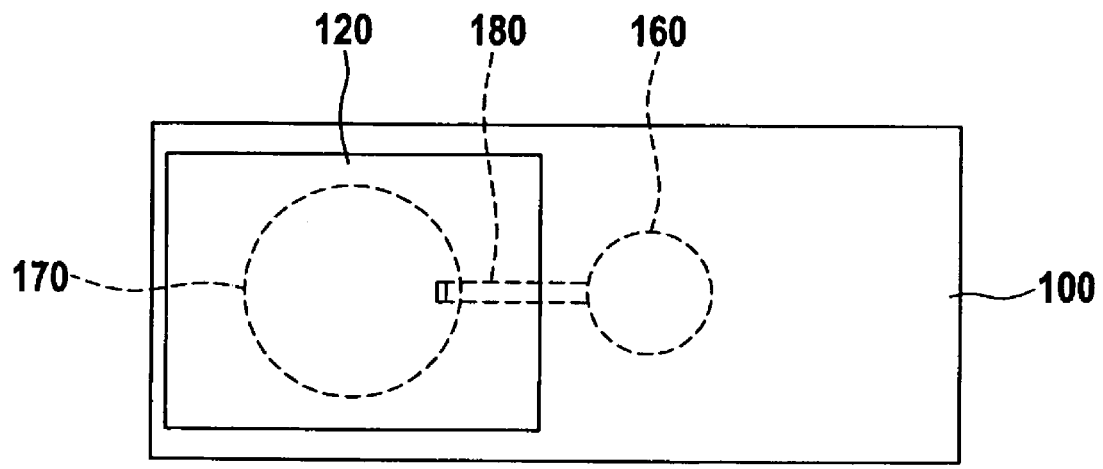

PRESSURE SENSOR HAVING A CAP ABOVE A FIRST DIAPHRAGM CONNECTED TO A HOLLOW SPACE BELOW A SECOND DIAPHRAGM

BACKGROUND OF THE INVENTION

1. Field of the Invention

The present invention relates to a pressure sensor for sensing the pressure of at least one medium, and also relates to a self-testing method.

2. Description of Related Art

Published German patent document DE 10 2004 021 041 A1 discloses a pressure sensor in which both an absolute-pressure sensor and a differential-pressure sensor are integrated into one shared substrate.

BRIEF SUMMARY OF THE INVENTION

The present invention provides a micromechanical pressure sensor having a first and a second diaphragm that are housed in a shared semiconductor substrate, as well as a self-testing method with which the functionality of the pressure sensor can be checked. The two diaphragms serve for independent pressure sensing of one or more media by respectively sensing a pressure variable by way of the warping of the respective diaphragm. The essence of the invention is that a cap above the first diaphragm defines a hollow space that is connected to the hollow space below the second diaphragm.

By way of such a connection between the two hollow spaces, both the leak-tightness of the hollow space and the functionality of both diaphragms can be checked by way of the other diaphragm.

The configuration of the pressure sensor is particularly advantageous when the hollow spaces that are connected are completely delimited with respect to the environment. It is conceivable, for example, for the two hollow spaces to exhibit a vacuum or a defined pressure.

In a refinement of the invention, provision is made that in addition, evaluation means are provided which ascertain pressure variables as a function of the deflection of one or both diaphragms. In order to minimize the space requirement of the micromechanical pressure sensor, provision can be made in this context that at least a portion of the evaluation means is integrated into the semiconductor substrate in the physical vicinity of the diaphragms.

In order to sense the pressure of two media, provision can be made that suitable supply conduits lead from one side of the semiconductor substrate each to one diaphragm. It is, however, furthermore also possible for the diaphragms to be provided on different sides of the semiconductor substrate, so that the pressures of two media act on the semiconductor substrate from different sides. Disposition of the diaphragms on oppositely located sides of the semiconductor substrate is preferred in this context, since this enables easier construction in the context of structural and connection technology.

The cavity that is associated with the first diaphragm is advantageously produced by way of an etching process, e.g. a trench etching process or KOH etching.

Self-testing of the pressure sensor, which for example can also be integrated into the evaluation means directly on the semiconductor substrate, allows the leakage of the two hollow spaces to be inferred from the pressure variable of one of the two diaphragms, the second pressure variable of the second diaphragm preferably being utilized.

It is particularly advantageous that a sealing failure of hollow space 170 can be recognized by way of the second pressure variable. It is moreover also possible to perform the evaluation of the first pressure variable as a function of the second pressure variable, for example by the fact that an adaptation is carried out. With this procedure, a pressure decrease in hollow space 170 can be compensated for by way of the second pressure variable.

BRIEF DESCRIPTION OF THE SEVERAL VIEWS OF THE DRAWING

FIG. 1 shows a schematic cross section through an example embodiment of the pressure sensor according to the present invention.

FIG. 2 shows a plan view of the pressure sensor according to the present invention.

DETAILED DESCRIPTION OF THE INVENTION

The construction of a pressure sensor in accordance with the present invention is illustrated in FIG. 1. A semiconductor substrate 100, made e.g. of silicon, is used in this context, into which two diaphragms 110 and 140 are introduced by way of usual micromechanical methods.

In the exemplifying embodiment in accordance with FIG. 1, provision is made to produce first diaphragm 110 by introducing into substrate 100 from back side 155, by way of a suitable trench etching method, a trench hole that forms the subsequent cavity 130. The use of a buried stop layer, for example in the form of an oxide layer, allows even very thin diaphragms to be manufactured in this context. Alternatively, it is also possible to produce first diaphragm 110 and cavity 130 by way of a different usual etching method such as KOH etching.

Second diaphragm 140 is preferably produced using an APSM method; other etching methods that produce a continuous diaphragm 140 above a first open space 160 in semiconductor substrate 100 can also be used. In the present exemplifying embodiment, second diaphragm 140 is produced on front side 150 of semiconductor substrate 100. This is, however, only one particular embodiment of the invention. It is entirely conceivable, for example, also to produce the second diaphragm on back side 155. In this case, however, in order to sense the different pressures 210 and 220 it is necessary for two separate supply conduits to be provided from back side 155 to diaphragms 110 and 160.

In order to sense pressures 210 and 220, piezoresistors 115 are provided in first diaphragm 140, and piezoresistors 145 in second diaphragm 160. Evaluation of the pressure variables that can be sensed with these piezoresistors is accomplished in an evaluation circuit 190 that, in a particular embodiment of the invention, is integrated directly into semiconductor substrate 100. Alternatively, however, this evaluation circuit can also be provided externally, in which case corresponding electrical connections are provided for.

Optionally, semiconductor substrate 100 having the two diaphragms 110 and 140 can be mounted on a glass base 200, in which is introduced an access point to cavity 130 for the medium that is under pressure 210 and is to be monitored.

In order to produce an absolute pressure sensor from the differential pressure sensor that is formed by the two-sided access of media to diaphragm 110, a cap 120, in particular a seal-glass cap, which covers diaphragm 110, is mounted onto front side 150 of semiconductor substrate 100. With this cap 120, a second hollow space 170 is formed above first diaphragm 110 by way of the internal volume of cap 120, so that a deflection of diaphragm 110 can be interpreted directly as an indicator pressure 210 applied to the diaphragm.

In order to detect leakage in the two hollow spaces 160 and 170, a connecting channel 180 is provided which connects the two hollow spaces to one another. This connecting channel is preferably integrated directly into semiconductor substrate 100 (see the cross section in FIG. 1, and the plan view in FIG. 2, in this connection). Integration of the connecting channel can likewise be accomplished via APSM technology, so that the buried channel 180 is formed even before cap 120 is applied onto the semiconductor substrate. Example methods for this are described in, among others, published German patent documents DE 100 32 579 A1 and DE 10 2004 043357 A1. Access from hollow space 170 to the buried channel can be produced by way of a trench etching process. The plan view in FIG. 2 demonstrates graphically how the connection between the two hollow spaces 160 and 170 is provided by way of the buried channel.

By way of the construction described above, the sensor signal of the absolute-pressure sensor can be checked for plausibility, and compensated for within certain limits if hollow spaces 160 and 170 become leaky. For example, during manufacture of the sensor, i.e. upon application of cap 120 onto substrate 100, a vacuum or an atmosphere having a very low pressure becomes enclosed in hollow spaces 160 and 170. With the aid of this predefined pressure in hollow space 170, diaphragm 110 can be used as an absolute-pressure sensor for pressure 210. The pressure enclosed in hollow space 170 is checked by way of diaphragm 140. With the aid of the measuring devices on diaphragm 140, e.g. piezoresistors on its surface, cap 120 can be checked for leak-tightness immediately after it is applied. This is because if no change in the measured signal of diaphragm 140 is detected upon application of an external pressure 220 onto front side 150 of the sensor, a loss of cap sealing must be inferred, since both the pressure in hollow space 170 and thus in hollow space 160, and external pressure 220, are the same. It is thus possible to detect, immediately after the manufacturing process, whether the sensor is functioning correctly.

The proposed construction is, however, also advantageous during normal operation of the sensor. After the first function test of the sensor, for example, it is possible to store a measured value of the measurement device on diaphragm 140 that should occur at an external pressure 220 typical of the application. If this original value then changes during the service life of the sensor, a leak in the cap, in the cap connection, or in one of diaphragms 110 or 140 can the be inferred. If the original value changes only slowly, i.e. if the initial value decreases only over a long time interval, it can be assumed that the leak is small. In this case the deviation from the initial value can be used as a calibration variable for the measured value of diaphragm 110. Exact sensing of pressure 210 is thus still possible for a certain time in the context of small rips in diaphragm 140 or a small leak in, for example, the cap adhesive.

In addition, the present invention also allows a rip in diaphragm 110 to be inferred if the signal of the measuring device on diaphragm 110 decreases while the signal of the measuring device on diaphragm 140 continues to generate measured values.

In a further exemplifying embodiment, provision can also be made additionally to apply one or more temperature elements onto one or both diaphragms. These temperature elements serve to compensate, in the context of the sensed pressure variables, for the temperature existing at the respective diaphragm.

What is claimed is:

1. A pressure sensor, comprising:
    a semiconductor substrate;
    a first diaphragm and a second diaphragm in the semiconductor substrate, wherein a first pressure variable is sensed by the first diaphragm and a second pressure variable is sensed by the second diaphragm;
    a cavity located beneath the first diaphragm;
    a first hollow space located beneath the second diaphragm; and
    a cap positioned above the first diaphragm, wherein the cap forms a second hollow space, and wherein a connection is provided in the semiconductor substrate between the first hollow space and the second hollow space,
    wherein the first and second hollow spaces are decoupled with respect to the environment, and wherein the first and second hollow spaces exhibit a defined pressure with respect to the environment.

2. The pressure sensor as recited in claim 1, further comprising: an evaluation unit configured to ascertain at least one pressure variable as a function of a deflection of one of the two diaphragms.

3. The pressure sensor as recited in claim 1, wherein the first and second diaphragms are impinged upon by pressures from different sides of the semiconductor substrate.

4. The pressure sensor as recited in claim 1, wherein the cavity beneath the first diaphragm is produced by one of a trench etching process or KOH etching.

5. The pressure sensor as recited in claim 2, wherein the evaluation unit provides an evaluation of the first pressure variable as a function of the second pressure variable, and wherein the first pressure variable is corrected as a function of the second pressure variable.

6. A method for sensing a pressure, comprising:
    providing a pressure sensor having a first diaphragm and a second diaphragm in a semiconductor substrate, a cavity located beneath the first diaphragm, a first hollow space located beneath the second diaphragm, and a cap positioned above the first diaphragm, wherein the cap forms a second hollow space, and wherein a connection is provided in the semiconductor substrate between the first hollow space and the second hollow space;
    sensing a first pressure variable by the first diaphragm and sensing a second pressure variable by the second diaphragm; and
    evaluating the sensed first pressure variable as a function of the sensed second pressure variable,
    wherein a leakage of the second hollow space is inferred from the second pressure variable of the second diaphragm.

7. The method according to claim 6, wherein a temperature is taken into account in the evaluation of the first pressure variable.

* * * * *